Patented Nov. 24, 1931

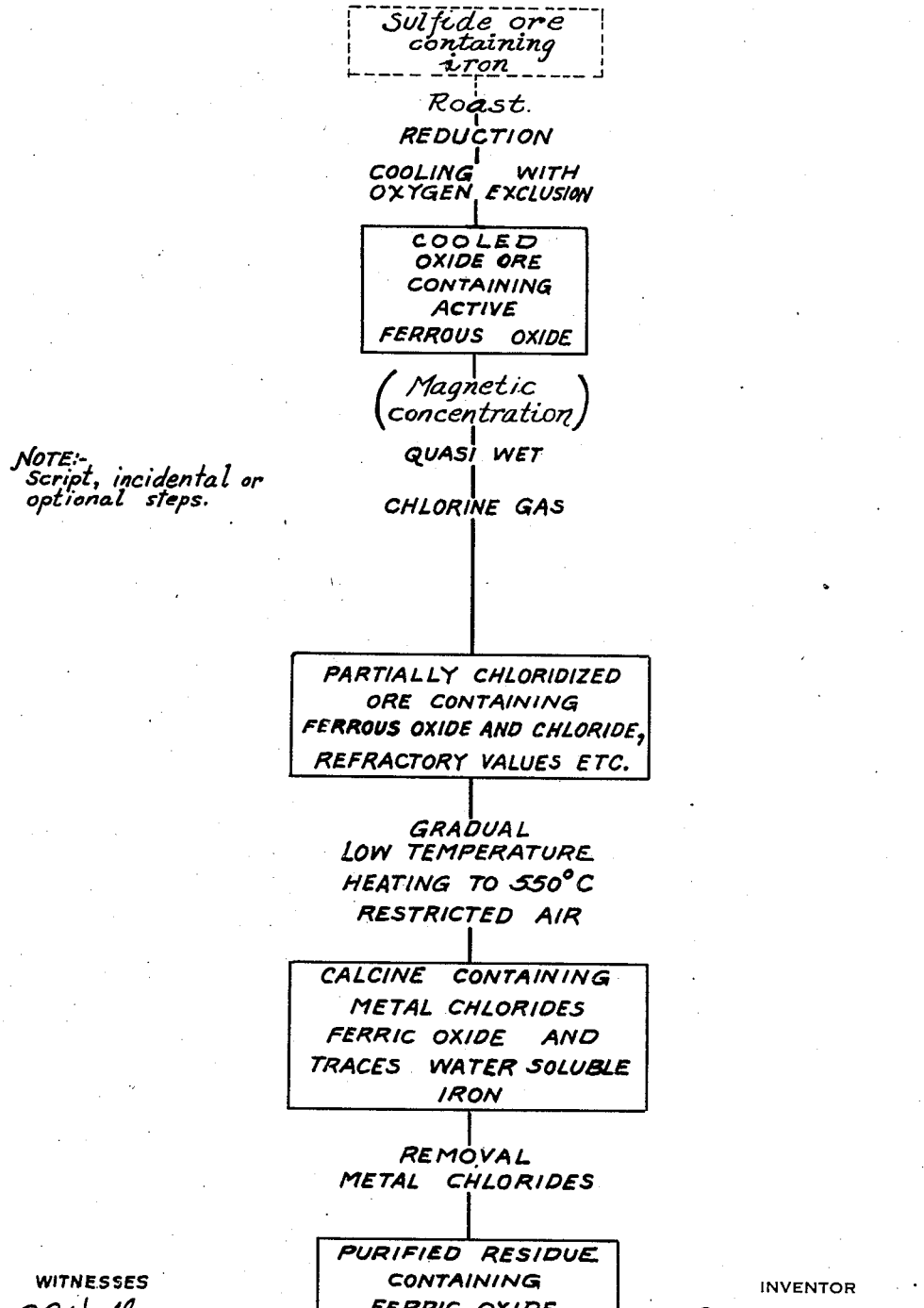

1,833,686

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

PROCESS OF BENEFICIATING IRON ORES

Application filed April 2, 1931. Serial No. 527,367.

This invention relates to the production of high grade iron ores.

The impurities which are present in all iron ores, such as sulfur, phosphorus, manganese, and silicon, appear in iron and steel made therefrom. Such impurities are generally undesirable in iron alloys, but it has not been possible to remove them completely, and only high grade iron ores are used at present in the production of iron. For this reason various low grade iron ores have been wholly rejected, either because of their high content of the impurities mentioned, or because they contain varying amounts of base metals.

The objects of the invention are to provide a process of beneficiating iron ores, which is adapted to remove metallic and non-metallic impurities substantially completely, is simple and readily practiced, provides ore of high grade, and is especially applicable to low grade ores for removal of base metals to adapt them for production of high quality iron.

The accompanying drawing is a flow sheet representative of the process of this invention, showing the steps which it embodies. In this flow sheet optional steps are indicated in script type.

The invention is predicated on my discovery that metalliferous materials containing a comparatively high content of iron in an oxidized condition may be substantially freed from metallic impurities, sulfur, phosphorus, arsenic, etc., by providing active ferrous oxide therein and treating such ore in quasi-wet condition with chlorine or hydrogen chloride and subjecting the thus-treated material to a heat treatment. The ore may then be leached with a simple solvent, such as water, to remove metallic impurities present in the original ore. Where the chief impurities are metalloids, no leaching will, in general, be necessary, since they may be driven from the ore by their volatilization as chlorine compounds at comparatively low temperature.

As a particular form of ferrous oxide, it is preferable to provide magnetic iron oxide (sometimes known as ferroso-ferric oxide), in an active form to facilitate combining free chlorine directly even with oxidized material. Active ferrous oxide also serves as an efficient agent to absorb and combine with hydrogen chloride formed in the early stages of the heat treatment. It forms ferrous chloride, which is very stable and when subsequently decomposed thermally at elevated temperature is a very effective chloridizing agent.

Magnetic iron oxide exists in two states, one relatively much more active than the other. The active form, when quasi-wet, rapidly combines even at normal temperature with free chlorine, and also is very easily attacked even by weak acids. The other form however is more dense; it is very appreciably less reactive with chlorine and with acids.

The active oxide is produced in situ with particularly effective distribution by treating ferric oxide with a reducing agent, such as hydrocarbon gas, $SO_2$ gas, or coal, at an elevated temperature, and cooling to normal temperature (150° C. or less) with care to eliminate moisture during cooling and with substantial exclusion of free oxygen also. Elimination of moisture during cooling is obtained readily by counter-current movement between the ore and the atmosphere in contact with the ore. After such reduction and cooling, the ferrous oxide is active as well as magnetic, but is unaffected at normal temperature by either free oxygen or water.

The processes provided by the invention are particularly adapted for the treatment of low grade ores to remove the metalloids, and base metals, such as copper, cobalt, nickel, manganese, and the like. The invention is also applicable to the high grade ores used at present, to remove the small amounts of metalloids and metals which they contain. All such materials are herein referred to as "iron ores."

In the preferred embodiment of the invention the ores are treated in a finely divided condition, and, in general, the finer their subdivision, the more rapid and complete the reactions will be. Where such subdivision of the ore becomes necessary or desirable, it may be ground, for example to 100-mesh, although finer grinding, say to pass 140 or 200-mesh, may be desirable in some cases. The sieve sizes here referred to relate to the specifications adopted by the U. S. Bureau of Standards.

In the practice of the invention with ores low in sulfide, so obtained by roasting if necessary, the ore containing active magnetic oxide is first rendered quasi-wet with liquid, and it is then treated with chlorine. Also, hydrogen chloride may be used, or mixtures of chlorine and hydrogen chloride; and it will be understood that as used in the specification and claims the term "chlorine" equally comprehends all of these materials.

As used herein the term "quasi-wet" refers to a moistened condition of the ore in which it is treated with an amount of liquid such as to dampen or saturate the individual particles, but insufficient to occupy the interstices between the particles, or to seep or percolate through the mass. Such ore is scarcely moist to the touch. It requires considerable hand pressure to compact it but is friable and easily crumbles again. A portion of ore in this condition occupies more volume than either before being thus wet or when liquid in excess of this amount is present. The loose open structure of such ore assists this optimum moisture condition in the subsequent reactions upon the metal values. The amount of liquid required for quasi-wetting varies with different ores but is readily ascertainable by these tests.

The benefits of the invention are in large part dependent on this quasi-wetting. In this condition the particles contain a small amount of liquid which is quickly and easily saturated with chlorine, to form concentrated reagent solutions in intimate contact with the ore. Also, the liquid may hydrate or dissolve some small amount of the chlorides formed, to expose fresh surfaces for attack. As a result, a more rapid and far reaching attack is obtained than has formerly been realized by direct treatment with chlorine.

Any suitable liquid may be used to render the ore quasi-wet. Water is preferred for most purposes, although reagent solutions, such as aqueous solutions of chlorine or sodium chloride may also be used. Liquid may be appied in any suitable manner permitting control so that the ore does not become more than quasi-wet. It is especially advantageous to agitate the ore and to keep it quasi-wet during the chlorine treatment.

In the treatment of ores containing small amounts of sulfide, the quasi-wet material containing chlorine is then treated to break down the sulfide molecule. This may be effected largely by oxidation, as by exposure to air, either with the ore at rest until such time as tests determine the chloridizing to have reached an optimum degree, or with agitation to shorten the time. The amount of air at this stage need not be controlled particularly. Preferably, final chloridization is accomplished by heat treatment in a manner presently to be described.

Where the ores contain large amounts of sulfide, they are first roasted to oxidize the ore. The presence of ferrous sulfate need not be avoided since with air present subsequently during chlorine treatment, ferrous oxide is formed. In fact, ferrous sulfate facilitates the use of an equivalent amount of sodium chloride as a source of chlorine. Ferrous oxide may be obtained in roasting by restricting the air admitted to the furnace, though a particularly efficient distribution of active magnetic ferrous oxide is obtained by applying a reducing gas to the hot oxidized material and cooling it with elimination of moisture. For example, excellent preparation is obtained by so treating and cooling such material from 400° to 600° C. in a reducing atmosphere of producer gas, water gas, natural gas, or with ground coal, until normal temperature (150° or less) is attained. The roasted ore when cooled, and finely divided if necessary, is rendered quasi-wet, after which it is treated with chlorine in the manner described. It is preferable to control the amount of air at the roasting stage so that a small amount of water-soluble iron remains, for example, up to one and one-half per-cent. This prevents oxidation of the impurities that are to be removed. It is advantageous to introduce the air in counter-current flow to the iron ore where the water-soluble iron is to be kept to a minimum.

Where the ores contain large amounts of sulfide they are first roasted, preferably by means of an oxidizing roast, to convert the iron to oxide. The roasted ore is sufficiently reduced and cooled, finely divided if necessary, and rendered quasi-wet, after which it is treated with chlorine in the manner described above.

This chlorine treatment with ore in the quasi-wet condition causes the formation of ferrous chloride, and other metals are also partly converted to chloride. The amount of ferrous chloride need not greatly exceed that necessary for chloridizing the impurities to be removed. Two or three percent ferrous chloride in excess of the theoretical amount for this purpose assures practically complete results and is a preferred amount.

I have found that if the ore is now heat treated, the iron chloride is converted to oxide, and a profound chloridizing action occurs in which impurities, such as metals other than iron, and metalloids, are removed or converted to readily soluble forms, and that this action is complete or substantially complete.

The heat treatment may be, and preferably is, carried out in a muffle furnace, in the presence of a limited amount of air. The material is first heated and dried at about 100° to 200° C., when some hydrogen chloride and considerable steam are evolved. The hydrogen chloride, being nascent and hot, exerts a powerful attack upon sulfides, oxides, carbonates, and the like. Likewise, the hydrogen-chloride acts upon the ferrous oxide to form more stable ferrous chloride.

When this reaction is complete, the temperature is raised to about 250° to 350° C., when further amounts of hydrogen chloride and some chlorine will be given off. Two hours heating at this temperature will usually suffice. If necessary the temperature is now raised to about 450° to 500° or 550° C., to complete the desired decomposition of iron chloride and conversion of the impurities.

It is advantageous to add a chloride, such as common salt to the ore before heat treatment, to provide additional chlorine. It may be admixed with the ore before quasi-wetting, or in solution in the water used to render the material quasi-wet, or it may be added before or during heat treatment.

In the case of some ores the treatment may be completed at the lower temperature by conducting the heating under pressure, for example that built up by the steam and other gases in the furnace. Low pressures of about 1 to 5 pounds gauge are preferred.

Some impurities may be volatilized during heat treatment, and some are converted to readily soluble chlorides. For example, the hot nascent hydrogen chloride and chlorine cause the formation of volatile compounds of arsenic, phosphorus and sulfur, which pass out in the fume, while metallic impurities are converted to soluble chlorides. After cooling, the ore may be leached with water to remove solubilized nonvolatile impurities, leaving iron ore substantially free from all impurities except silica.

The ore may be further beneficiated to remove silica by concentrating this material out, and this may be done before the introduction of chlorine or thereafter. It is particularly effective to remove siliceous material and other gangue by magnetic separation of the ore, since the magnetic ferrous oxide takes with it from the gangue substantially all the iron compounds and those impurities that are removable by chloridizing. Thus the chloridizing need not be applied to inert gangue. Where resort is had to magnetic separation it is applied before roasting since the treatment above 250° C. with air converts considerable ferrous oxide to nonmagnetic oxides. In some instances, the steps of leaching and concentration to remove silica may be combined. And where no objectionable metal is present, leaching may be dispensed with.

The following actual example selected from my tests shows the benefits to be derived from the practice of the invention. An ore containing from 40 to 45 percent of iron, about 30 percent of sulfur, 3.02 percent of copper, 1.17 percent of cobalt, and 0.5 percent of arsenic, together with some phosphorus was ground to 200-mesh and roasted 3½ hours below about 750° C. During the last stages of roasting the air was restricted so that reducing conditions obtained, due to the sulfur dioxide of the roast, for the purpose of producing ferrous iron compound in the ore. Alternatively ferrous oxide may be added as such after roasting, but a particularly efficient distribution of it is obtained in the ore by producing it in situ. The roasted ore was ground to approximately 200-mesh and leached cold with 4 percent sulfuric acid and then with water until the sulfates were completely washed out. The ore was then dried until it contained about 15 percent of water, which rendered it properly quasi-wet, after which it was treated with chlorine. The ore was stirred during passage of the chlorine into it, and owing to the evolution of a large amount of heat, it was necessary to restrict the rate of chlorine addition.

The ore was next heat treated in a closed muffle. The heat treatment comprised heating for 3 hours at 100° to 150° C., during which time the ore was turned over every 10 minutes, air being simultaneously introduced for one minute. The fumes evolved comprised large amounts of steam and hydrogen chloride, together with a little chlorine. Sulfur and phosphorus were volatilized also. The temperature was then gradually increased to a maximum of about 450° C. with the same ore agitation and restriction of air. This step required three hours, and at the end of this time there was marked diminution in the chlorine-hydrogen chloride evolution, which indicated that the iron chlorides were practically completely broken down. After cooling the ore was leached with water, and analysis showed that a trace of iron and 96.5 percent of the copper and 95 percent of the cobalt were soluble, while sulfur, phosphorus and arsenic were practically eliminated. The ore thus treated was suitable for iron manufacture.

The sulfuric acid leaching was performed merely to prove that the chlorine and lower oxides were the really active agents and that the presence of sulfates was unnecessary.

Another ore containing 25 to 30 percent of sulfur, about 40 percent of iron, 3.64 percent of nickel, 0.26 percent of copper, and 0.3 per cent of cobalt, with small amounts of arsenic and phosphorus was treated in the same manner. Analysis of the final ore showed practically no sulfur or phosphorus, while the content of metallic impurities was as follows:

| | Per cent |
|---|---|
| Cobalt | 0.08 |
| Copper | 0.02 |
| Nickel | 0.11 |

The leach liquor showed but a trace of iron. The residual ore was in good condition for concentrating out the silica.

These examples show that impure iron ores can be readily beneficiated by the processes according to the invention, so that they are suitable for the manufacture of pure iron. The metalloids are removed substantially completely, and metallic impurities may be removed to an extent such that they are not objectionable. It will be seen also that the impurities thus removed may be recovered readily, as valuable by-products.

A particularly desirable mode of procedure in accordance with the invention is to feed the ore to the top hearth of a multiple hearth muffle type furnace arranged for up draft. In operation the steam from the lower hearths is condensed on the incoming ore to render it quasi-wet and attackable by the gases which also pass upwardly over this material. The hydrogen chloride and chlorine in these gases react with the lower oxides of iron and other metals to form chlorides, and any sulfur, phosphorus or the like is volatilized. As the ore reaches the hotter part of the furnace the iron chlorides are broken down, forming oxide and liberating hydrogen chloride and/or chlorine which passes up to react on fresh ore. The ore leaving the furnace is then in condition to be leached, or if pure enough, to be reduced.

Where the original ore contains metal values, they may be recovered from the leach liquors, thus off-setting the cost of treatment. Further economies are possible by using the gases evolved in heat treatment to treat fresh ore. Such gases may be used in place of or with chlorine to form ferrous chloride in the fresh ore. Or, they may be treated to convert the hydrogen chloride to chlorine, which is then used. This may be accomplished by passing the gases over heated bricks saturated with copper chloride.

According to the provisions of the patent statutes, I have explained the principle and mode of operation of my invention, and have described what I now consider to represent its best embodiment. However, I desire to have it understood that, within the scope of the appended claims, the invention may be practiced otherwise than as specifically described.

I claim:

1. In a process of beneficiating iron ores, the steps comprising rendering the ore quasi-wet with liquid, treating the quasi-wet ore with chlorine, and heating at an elevated temperature to remove impurities.

2. A process of beneficiating iron ores, comprising providing ferrous oxide therein and rendering the ore quasi-wet with liquid, treating the quasi-wet ore with chlorine, heating at an elevated temperature to chloridize impurities and render the iron insoluble, and subsequently leaching out solubilized impurities.

3. A process of beneficiating iron ore comprising providing active ferrous oxide therein, treating the mixture, finely divided to pass 100-mesh, with liquid to render it quasi-wet, mixing in common salt, treating the quasi-wet ore with chlorine, heating at an elevated temperature, whereby to chloridize impurities and render the iron insoluble, and subsequently leaching out the solubilized impurities.

4. A process of beneficiating iron ores comprising providing active ferrous oxide therein and treating the ore ground to pass 100-mesh with water to render it quasi-wet, treating the quasi-wet ore with chlorine, heating at a temperature between about 100° and 550° C., whereby to chloridize impurities and render the iron insoluble, and subsequently leaching out the solubilized impurities.

5. A process according to claim 4, the ore being mixed with common salt prior to heating.

6. In a process of beneficiating iron ores the steps comprising reduction with elimination of moisture to provide active ferrous oxide therein, then rendering the ore quasi-wet ore with liquid, treating the quasi-wet ore with chlorine, and heating at an elevated temperature to chloridize and remove impurities and render the iron insoluble.

7. A process of beneficiating iron ores comprising providing active ferrous oxide therein and rendering the ore in a finely divided condition wet with liquid, treating the quasi-wet ore with chlorine, heating at a temperature between 100° and 550° C., whereby to chloridize impurities and render the iron insoluble, concentrating out silica, and subsequently leaching to remove the solubilized impurities.

8. A process of beneficiating iron ores comprising providing active ferrous oxide therein and reducing the ore size to minus 100-mesh, mixing it with common salt, rendering the mixture quasi-wet with water, treating the quasi-wet ore with chlorine, heating at a temperature between 100° and 550° C., whereby to chloridize impurities and render the iron insoluble, concentrating out silica, and leaching out the solubilized impurities.

9. A process of treating iron-rich sulfide-containing ores to produce high grade iron ore substantially free from base metals, sulfur, and phosphorus, comprising roasting such ore to break up sulfide sulfur, reducing at between 400° to 600° C. and cooling to normal temperature with elimination of moisture to provide active ferrous oxide therein, finely dividing the resultant material, rendering it quasi-wet with liquid, treating the quasi-wet material with chlorine, heating at an elevated temperature above about 100° C., whereby to chloridize impurities and render the iron insoluble, and subsequently leaching out the solubilized impurities.

10. A process of treating iron-rich sulfide-containing ores to produce high grade iron ore substantially free from base metals, sulfur, and phosphorus, comprising roasting the the ore to break up sulfide sulfur, reducing to provide active magnetic ferrous oxide therein, grinding the material to pass 100-mesh, magnetically separating ore values from gangue, rendering the ore values quasi-wet with water, treating the quasi-wet material with chlorine, heating at an elevated temperature above about 100° C., whereby to chloridize impurities and render the iron insoluble, and subsequently leaching out the solubilized impurities.

11. A process according to claim 9, said ore being mixed with common salt.

12. A process according to claim 9, characterized by the added step of concentrating out silica.

13. In a process of beneficiating iron ores, the steps comprising providing active ferrous oxide therein and treating the ore ground to pass 100-mesh with water to render it quasi-wet, treating the quasi-wet ore with chlorine and heating under pressure at a temperature between about 100° C. and 250° C., whereby to chloridize impurities and render iron insoluble.

14. In a process of beneficiating iron ores, the steps comprising treating a quasi-wet mixture of common salt and iron ore finely divided to pass 100-mesh with chlorine and heating under a pressure of about 1 to 5 pounds per square inch at a temperature of about 100° to 250° C., whereby to chloridize impurities and render iron insoluble.

15. In a process of beneficiating oxidized iron ores, the steps of treating said ores at elevated temperature with reducing agent and cooling with elimination of water vapor to provide active magnetic iron oxide therein, magnetically separating ore values from gangue, quasi-wetting the ore values, absorbing chlorine in the ore in quasi-wet condition, and heating to chloridize impurities and render iron insoluble.

In testimony whereof, I sign my name.

RALPH F. MEYER.